United States Patent [19]

Permuy et al.

[11] Patent Number: 5,586,086
[45] Date of Patent: Dec. 17, 1996

[54] METHOD AND A SYSTEM FOR LOCATING A FIREARM ON THE BASIS OF ACOUSTIC DETECTION

[75] Inventors: Alfred Permuy, Rueil Malmaison; Pierre-Henri Vimort, Ecully, both of France

[73] Assignee: Societe Anonyme: Metravib R.D.S., France

[21] Appl. No.: 452,101

[22] Filed: May 26, 1995

[30] Foreign Application Priority Data

May 27, 1994 [FR] France .................. 94 06729

[51] Int. Cl.⁶ ........................................ G01S 3/80
[52] U.S. Cl. ............................. 367/127; 367/906
[58] Field of Search ........................ 367/127, 129, 367/906

[56] References Cited

U.S. PATENT DOCUMENTS 2,966,657  12/1960  Price .......................... 367/129
5,241,518  8/1993  McNelis et al. ............ 367/127

FOREIGN PATENT DOCUMENTS

0003095A1  7/1979  European Pat. Off. .
3322500A1  3/1987  Germany .
3544289A1  6/1987  Germany .
WO93/16395  8/1993  WIPO .

*Primary Examiner*—Daniel T. Pihulic
*Attorney, Agent, or Firm*—Bacon & Thomas

[57] ABSTRACT

Location of a firearm firing projectiles is accomplished by using an acoustic detection antenna that includes at least three microphones spaced apart from one another to detect and record signals and time offsets of the signals which are representative of the muzzle noise of the firearm and/or the soundwave emitted by the mach cone generated by a projectile that has supersonic muzzle velocity, and processing the signals and their time offsets in such a manner as to determine at least the direction in which the firearm is located.

10 Claims, 2 Drawing Sheets

METHOD AND A SYSTEM FOR LOCATING A FIREARM ON THE BASIS OF ACOUSTIC DETECTION

BACKGROUND OF THE INVENTION

The present invention relates to the technical field of locating a firearm in three dimensions on the basis of acoustic detection, where the term "firearm" is used broadly, e.g. to cover an individual weapon such as a shot gun or a rifle, or a weapon requiring a crew such as a machine gun, a mortar, or a field gun.

More precisely, the invention covers the field of using acoustic detection to locate firearms that fire projectiles having a muzzle velocity that is preferably, although not exclusively, supersonic.

An ever-increasing need can be seen, particularly due to attacks by guerillas, armed civil conflicts, or in the context of humanitarian action taken in unstable regions, to have technical means for locating firearms liable to cause damage, whether to people or to property. It has been found that marksmen, even though often isolated, are nevertheless capable of constituting a real danger against which it is difficult to provide effective protection.

Systems, and in particular acoustic systems have therefore been developed to warn people that they are being shot at. For example, an acoustic detection system is known for helicopters so as to warn the crew that the helicopter is under fire, it being understood that the crew members cannot hear the sound of firing because of the high level of noise that exists in the helicopter.

Nevertheless, that system constitutes no more than means of providing a warning that shots are being fired, and it is incapable of indicating the position of the weapon, such that the people under fire cannot determine their best position for sheltering from the fire or for taking out the aggressor.

There is therefore a need to have means that are suitable for accurately locating a firearm, in order to enable appropriate measures to be adopted for protecting people or property.

SUMMARY OF THE INVENTION

The invention thus seeks to satisfy the above need by providing a method of locating a firearm firing projectiles, the method making use of an acoustic detection antenna that comprises i microphones, where i is not less than three, which microphones are spaced apart from one another in known manner.

To achieve this object, the method consists in:

detecting and recording in time, the signals and the time offsets thereof as delivered by the microphones and representative of the muzzle noise of the firearm; and processing said signals and their time offsets in such a manner as to determine at least the direction in which the firearm is located.

The invention also seeks to provide a method that is suitable for locating a firearm that fires projectiles having a muzzle velocity that is supersonic. To this end, the method of the invention consists in:

detecting and recording in time, the signals and the time offsets thereof as delivered by the microphones and representative of the soundwave emitted by the Mach cone generated by a projectile that has supersonic muzzle velocity; and processing said signals representative of the Mach cone soundwave and the time offsets thereof so as to determine, with the help of the signals representative of the muzzle noise and the corresponding time offsets, at least the direction in which the firearm is located.

In a variant implementation, the signals and their time offsets are processed by an interferometer or a goniometric direction finder technique.

The invention also seeks to propose apparatus for locating a firearm that fires projectiles, the system using an acoustic detection antenna including at least i microphones that are spaced apart from one another in known manner. According to the invention, the apparatus comprises:

a microphone conditioning stage; and a processing and display unit comprising:

means for detecting and recording in time, on the basis of the signals delivered by the microphones, the signals and the time offsets thereof that are representative of the muzzle noise of the firearm;

means for processing said signals and their time offsets representative of the muzzle noise, the processing means being adapted to determine at least the direction in which the firearm is located; and display means indicating at least the direction in which the firearm is located.

Various other characteristics appear from the following description given with reference to the accompanying drawings which show embodiments and implementations of the invention that are given as non-limiting examples.

DETAILED DESCRIPTION OF THE PREFERRED EMBODIMENTS

Figure 1:
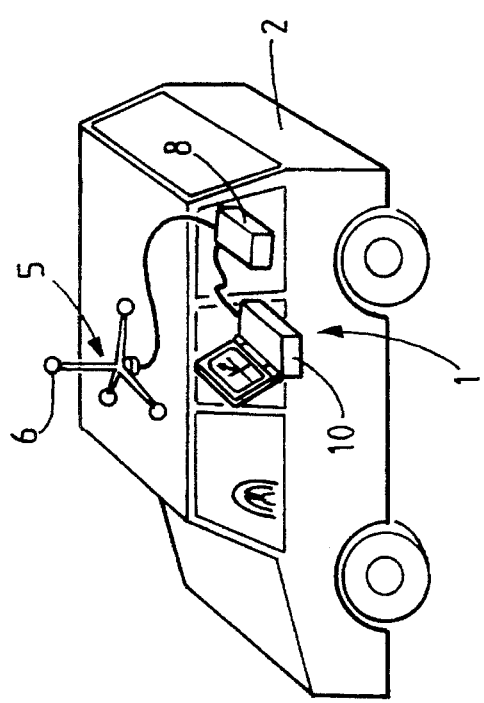
FIG. 1 is a diagrammatic view showing an embodiment of locating apparatus of the invention.
Figure 2:
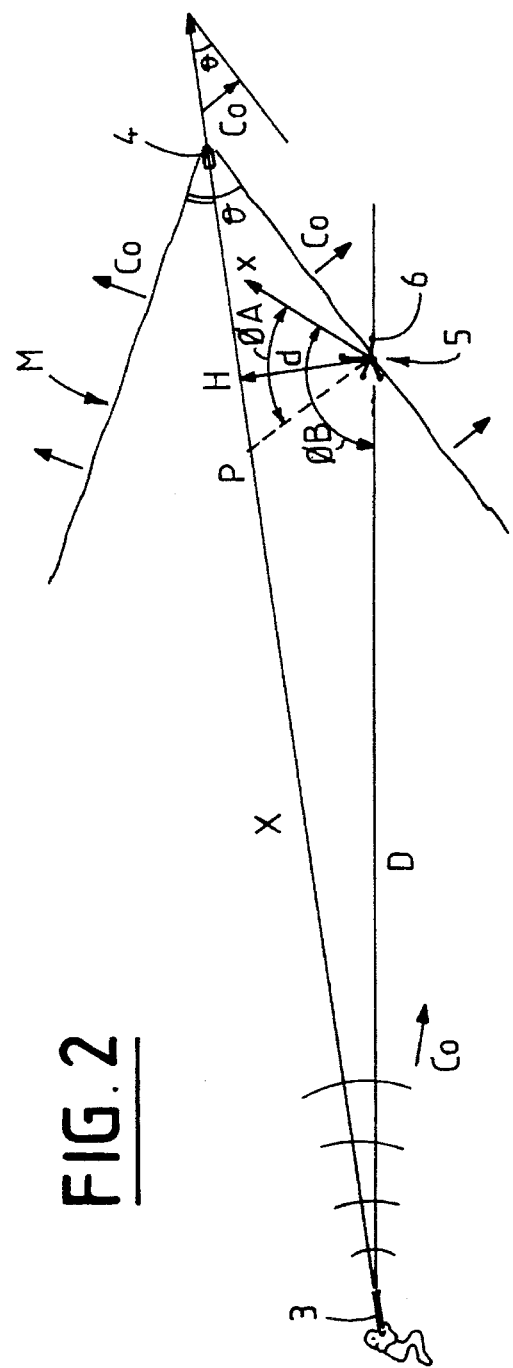
FIG. 2 is a diagram illustrating the detection principle used by the locating apparatus of the invention.

As can be seen more clearly in FIGS. 1 and 2, the invention relates to apparatus 1 located at a fixed position, or else fitted to a vehicle 2, as in the example shown. The apparatus 1 is designed to locate a firearm 3 firing a projectile 4. The firearm 3 may be of any known type that is capable of firing a projectile 4. In the preferred example described below, the muzzle velocity c of the projectile 4 is supersonic.

The apparatus 1 of the invention comprises an acoustic detection antenna 5 serving to detect the soundwaves generated by firing the projectile 4. The apparatus 1 comprises i microphones 6 (where i is not less than 3), which are spaced apart from one another in known manner. The antenna 5 is preferably made up of three to five microphones 6 that are spaced apart from one another by several tens of centimeters. As can be seen more precisely in FIG. 2, when a projectile 4 is fired towards the antenna 5 along an axis X, the microphones 6 initially detect the appearance of a soundwave that is emitted in uniform manner in a cone M whose apex is formed by the projectile 4. The cone M is usually known as the Mach cone and it has an angle θ at the apex of the cone such that:

$$\theta = \text{Arc sin}(c_o/c)$$

where $c_O$ is the speed of sound and c is the mean velocity of the projectile 4. This soundwave is referred to as Noise A, and it corresponds to a sound that is intense and of short duration and that can be thought of as being a rather sharp snap. The antenna 5 detects the noise at the instant which corresponds to the time taken by the projectile 4 to travel from the weapon 3 to point P, plus the propagation time required by the sound to travel from point P to the antenna 5. It should be observed that the point P is defined as being the point of intersection of the axis X and the vector $\overline{c_O}$ whose point of intersection with the Mach cone coincides with the antenna 5. Writing the range between the weapon 3 and the antenna 5 as D, Noise A reaches the antenna 5 at instant $t_A$, such that:

$$t_A = t_O + (D - d \cdot \tan\theta)/c + d/(c_O \cdot \cos\theta)$$

where c is the mean velocity of the projectile, $t_O$ is the firing instant, and d is the aiming error which corresponds to the range between the antenna 5 and the point H of intersection on the axis X of a perpendicular thereto from the antenna 5.

Assuming that the range D is large compared with the miss distance d of the shot, instant $t_A$ can be expressed as follows:

$$t_A \approx t_O + (D/c)$$

Figure 3:
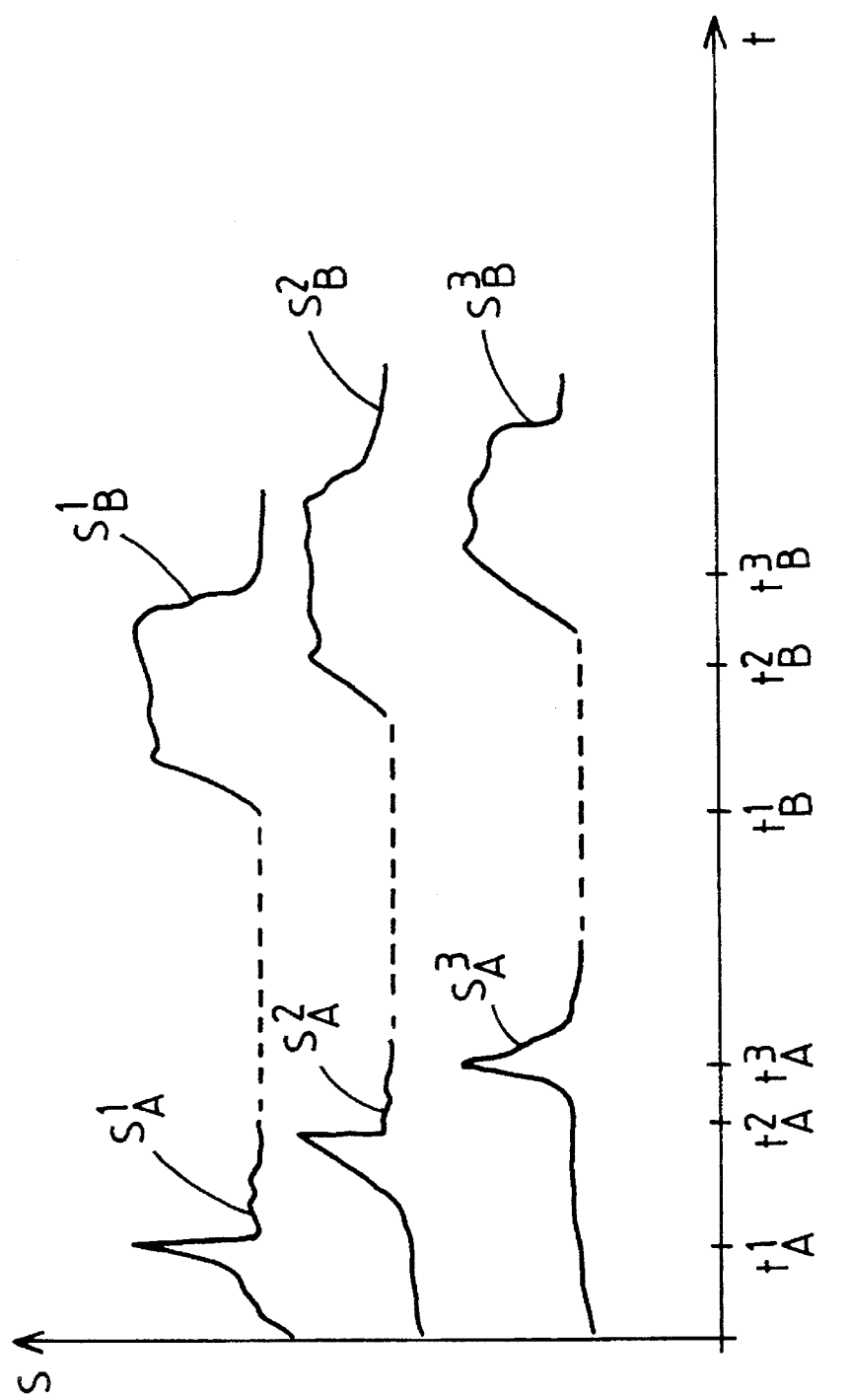
FIG. 3 shows an example of signals on the basis of which the method of the invention is implemented.

As can be seen more clearly in FIG. 3, the signals S as delivered by the microphones 6 as a function of time t, have respective peaks that are mutually offset in time $t^i_A$ because they have different positions relative to Noise A. In the example shown, three microphones 6 are used, thereby providing three signals $S^1_A$, $S^2_A$, and $S^3_A$ at respective instants $t^1_A$, $t^2_A$, and $t^3_A$. Such signals are thus representative of the soundwave A as emitted in the Mach cone M that is generated by the projectile 4. The invention therefore seeks to detect and record the signals $S^i_A$ and their time offsets $t^i_A$.

The invention also seeks to detect and record, as a function of time, other signals $S^i_B$ together with their respective time offsets $t^i_B$. These other signals $S^i_B$ are also delivered by the microphones 6 and they represent the muzzle noise B of the firearm. In the example shown, the apparatus records the signals delivered by each of the three microphones respectively, namely the signals $S^1_B$, $S^2_B$, and $S^3_B$, together with their respective time offsets $t^1_B$, $t^2_B$, and $t^3_B$. In conventional manner, the muzzle noise B of a firearm is pyrotechnical in origin and is related to the expansion of the combustion gases of the propellant charge in the gun barrel. The muzzle noise B of the weapon, referred to as Noise B, is emitted from the weapon 3 at instant $t_O$, and it propagates acoustically in a straight line from the location of the weapon 3 to the antenna 5. The arrival time $t_B$ of this Noise B is thus such that:

$$t_B = t_O + (D/c_O)$$

According to the invention, the signals $S^i_A$ and $S^i_B$, together with their associated time offsets $t^i_A$ and $t^i_B$ are processed so as to determine at least the direction on which the firearm is located. The method thus seeks to determine at least the azimuth angle $\phi_B$, i.e. the angle between a given reference axis x and the direction from which the muzzle noise B arrives in the horizontal plane, thus making it possible to determine the direction from which the projectile 4 came.

According to an advantageous feature of the invention, the method seeks to process the signals $S^i_A$ and $S^i_B$ together with their time offsets $t^i_A$ and $t^i_B$ by using a conventional interferometric or goniometric direction-finding method known to the person skilled in the art in order to determine the angle $\phi_B$.

According to another feature of the invention, the processing method may be adapted so as to determine the velocity c of the projectile 4, i.e.:

$$c = c_O / \sin(\phi_B - \phi_A)$$

assuming the miss distance d<<D with $c_O$ being the speed of sound and $\phi_A$ and $\phi_B$ being the respective azimuth angles of Noises A and B.

The method of the invention is also suitable for determining the range D to the firearm 3 from the detection antenna 5. The range D is such that:

$$D = [(t_A - t_b)/(c_O - c)] \cdot c_O \cdot c$$

providing the miss distance d<<D and where c is the mean velocity of the projectile.

It should be observed that the method of the invention can be used to determine, if necessary, the nature of the projectile 4 and of the weapon 3. To this end, firing tables characterizing various types of weapon on the basis of projectile velocity as a function of range are recorded and are used as references with which to compare the detected muzzle noise signal, and the measured range D and velocity.

The method of the invention thus makes it possible, as from the first shot, to provide all of the information that is essential for enabling the most appropriate reaction to be made to the incoming fire. Such a method thus has the advantage of determining accurately the direction to the marksman, and also projectile velocity, range to the marksman, and/or the nature of the projectile and the weapon.

More particularly, FIG. 1 shows apparatus for implementing the method of the invention. The apparatus 1 of the invention comprises an acoustic antenna 5 provided with at least three microphones 6 that are connected via a microphone-conditioning stage 8 to a processing and display unit 10 that includes means suitable for implementing the locating method of the invention. Thus, the processing and display unit 10 includes programmed means that detect and record in time the signals $S^i_A$, $S^i_B$ together with their associated time offsets $t^i_A$ and $t^i_B$ as delivered by the i microphones and representative respectively of the soundwave A as emitted in the Mach cone generated by the projectile, and the muzzle noise B of the firearm. The unit 10 also includes means for processing the signals $S^i_A$ and $S^i_B$ together with their time offsets $t^i_A$ and $t^i_B$ in such a manner as to determine at least the direction in which the firearm is located. The unit 10 also includes display means suitable for indicating the direction in which the firearm 3 is located in any appropriate manner.

The unit 10 preferably also includes processing means enabling the velocity c of the projectile and the range D to the firearm to be determined, together with means for storing firing tables characteristic of various types of weapon so as to make it possible to determine the type of projectile and weapon concerned by making comparisons with the form of the muzzle noise and the range D as measured.

In the above description, the firearm is located on the basis of respective signals representative of the muzzle noise B of the firearm and of the soundwave A emitted in the Mach cone as generated by a projectile 4 whose muzzle velocity is supersonic. Naturally, the method of the invention also makes it possible to locate a firearm that fires a projectile 4 whose muzzle velocity is subsonic, i.e. one that does not generate a Mach cone M. Under such circumstances, localization is performed solely on the basis of the signals $S^i_B$ representative of the muzzle noise B and of their time offsets $t^i_B$.

The invention is not limited to the examples described and shown, and various modifications can be made thereto without going beyond the ambit of the invention.

We claim:

1. A method of locating a firearm firing projectiles, the method making use of an acoustic detection antenna that comprises i microphones, where i is not less than three, which microphones are spaced apart from one another in known manner, the method comprising the steps of:

detecting and recording in time, the signals $S^i_A$ and the time offsets $t^i_A$ thereof as delivered by the i microphones and representative of the soundwave (A) emitted by the Mach cone generated by a projectile that has supersonic muzzle velocity; and detecting and recording in time, the signals $S^i_B$ and the time offsets $t^i_B$ thereof as delivered by the i microphones (6) and representative of the muzzle noise (B) of the firearm; and processing said signals $S^i_A$ representative of the Mach cone soundwave (a) and the time offsets $t^i_A$ and processing said signals $S^i_B$ and their time offsets $t^i_B$ in such a manner as to determine at least the direction $\phi_B$ in which the firearm is located.

2. A method according to claim 1, wherein the step of processing the signals $S^i_A$, $S^i_B$ and their time offsets $t^i_A$, $t^i_B$ is carried out by using an interferometer or a goniometric direction finder technique.

3. A method according to claim 1, further comprising the step of processing the measurements in such a manner as to determine the velocity c of the projectile which is equal to $c_O/\sin(\phi_B - \phi_A)$, where $c_O$ is the speed of sound, and $\phi_A$ and $\phi_B$ are the azimuth angles of the Mach cone noise and of the muzzle noise (A and B).

4. A method according to claim 3, further comprising the step of processing the measurements in such a manner as to determine the range D to the firearm from the detection antenna using $$D=[(t_A-t_b)/(c_O-c)] \cdot c_O \cdot c$$

where $t_A$ and $t_B$ are the respective instants at which the Mach cone noise (A) and the muzzle noise (B) are detected.

5. A method according to claim 3, further comprising the steps of using firstly the form of the muzzle noise signal as a function of velocity and range D, and secondly prerecorded firing tables characterizing various types of weapon on the basis of projectile speed as a function of range, to determine the type of projectile and the type of weapon used.

6. Apparatus for locating a firearm firing projectiles, the apparatus using an acoustic detection antenna that includes at least i microphones, where $i \geq 3$, where the microphones are spaced apart from one another in known manner, the apparatus being characterized in that it comprises:

a microphone conditioning stage; and a processing and display unit comprising:

means for detecting and recording in time, the signals $S^i_A$ and the time offsets $t^i_A$ thereof as delivered by the i microphones and representative of the soundwave (A) emitted by the Mach cone generated by a projectile that has supersonic muzzle velocity; and means for detecting and recording in time, the signals $S^i_B$ and the time offsets $t^i_B$ thereof as delivered by the i microphones and representative of the muzzle noise (B) of the firearm; and means for processing said signals $S^i_A$ representative of the Mach cone soundwave (a) and the time offsets $t^i_A$ and processing said signals $S^i_B$ and their time offsets $t^i_B$ in such a manner as to determine at least the direction $\phi_B$ in which the firearm is located; and display means indicating at least the directions in which the firearm is located.

7. Apparatus according to claim 6, wherein the processing means implement an interferometer or a goniometric direction-finding technique.

8. Apparatus according to claim 6, wherein the processing means enable the velocity c of the projectile to be determined which is equal to $c_O/\sin(\phi_B-\phi_A)$, where $c_O$ is the speed of sound and $\phi_A$ and $\phi_B$ are the azimuth angles of the Mach cone noise (A) and the muzzle noise (B) respectively, and in that the display means are adapted to display the velocity of the projectile.

9. Apparatus according to claim 8, wherein the processing means enable the range D to the firearm from the detection antenna to be determined, where:

$$D=[(t_A-t_b)/(c_O-c)] \cdot c_O \cdot c$$

where $t_A$ and $t_B$ are the respective instants at which the Mach cone noise (A) and the muzzle noise (B) are detected, and in that the display means are adapted to display the range to the firearm.

10. Apparatus according to claim 6, wherein the processing and display unit includes means for recording firing tables that characterize various types of weapon, and in that the processor means enable the type of projectile and the type of weapon used to be determined on the basis of the form of the muzzle noise and the range D.

* * * * *